(12) United States Patent
Wachi

(10) Patent No.: US 6,843,575 B2
(45) Date of Patent: Jan. 18, 2005

(54) INSIDE REARVIEW MIRROR APPARATUS FOR VEHICLE

(75) Inventor: Kenichi Wachi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 104 days.

(21) Appl. No.: 10/292,912

(22) Filed: Nov. 13, 2002

(65) Prior Publication Data

US 2003/0112536 A1 Jun. 19, 2003

(30) Foreign Application Priority Data

Nov. 14, 2001 (JP) ........................................ 2001-349293

(51) Int. Cl.[7] .............................................. G02B 7/182
(52) U.S. Cl. ........................ 359/876; 359/838; 359/841; 359/865; 359/872; 359/874; 248/288.1; 248/481; 248/549; 248/900; 280/727
(58) Field of Search ................................ 359/606, 841, 359/865, 866, 872, 874, 876, 838; 248/288.1, 481, 549, 900; 280/727

(56) References Cited

U.S. PATENT DOCUMENTS

| 4,836,648 | A | * | 6/1989 | Niwayama ................... 359/606 |
| 5,016,979 | A | | 5/1991 | Yoshino |
| 5,153,781 | A | * | 10/1992 | Brandt ....................... 359/865 |
| 5,572,354 | A | | 11/1996 | Desmond et al. |
| 5,615,857 | A | | 4/1997 | Hook |

* cited by examiner

Primary Examiner—Audrey Chang
Assistant Examiner—Craig Curtis
(74) Attorney, Agent, or Firm—Foley & Lardner LLP (57) ABSTRACT

Even when a stay is mounted to a mounting surface with tilting angle different according to types of vehicles, a predetermined or more tilting range of the mirror assembly can be obtained, thereby securing a rear field of view. As a result, since an inside mirror can be for general-purpose use of types of vehicles having a mounting surface with different tilting angles, the inside mirror does not have to be designed and manufactured according to each type of vehicles, thereby lowering the cost of the inside mirror.

7 Claims, 10 Drawing Sheets

FIG.12

INSIDE REARVIEW MIRROR APPARATUS FOR VEHICLE

BACKGROUND OF THE INVENTION

1) Field of the Invention

The present invention relates to a rearview mirror apparatus, which has a one pivot mechanism, provided inside a vehicle (inside mirror). The terms "front" and "rear" have been defined based on the advancing direction of the vehicle.

2) Description of the Related Art

Inside mirrors have been described in U.S. Pat. Nos. 4,836,648, 5,016,979, and 5,615,857. In the inside mirror described in U.S. Pat. No. 4,836,648, a spherical portion 7a of a stay 7, and a two-piece bracket 20 of a mirror assembly 1 are mounted to be tiltable mutually. In the inside mirror described in U.S. Pat. No. 5,016,979, a spherical portion 3 of a stay 1 and a three-piece bracket 5 of a mirror assembly are mounted to be tiltable mutually. In the inside mirror described in U.S. Patent Publication No. 5,615,857, a retain cup 122 of a stay 36 and a spherical portion 46 of a mirror assembly 52 are mounted to be tiltable mutually.

The inside mirror generally has a stay, one end of which is fixed to some place inside the vehicle, and a mirror assembly mounted tiltably to the other end of the stay via one pivot mechanism. The one pivot mechanism generally includes a spherical portion and a bracket or a cup. The inside mirror is an important accessory that gives a view of the rear side of the vehicle. The driver can adjust the position and the angle of the inside mirror, so that a desired view can be obtained, according to figure, physique and posture of the driver. Such an adjustment is performed by tilting the mirror assembly in the pivot mechanism with respect to the stay. The tilting range of the inside mirror is such that the drivers with any type of figure, physique, and posture can adjust the inside mirror to obtain the desired view.

One example of the predetermined tilting range of the mirror assembly is such that, for instance, a normal of the reflecting surface of the mirror assembly tilts 12° upward and 15° downward with respect to a horizontal line.

However, the conventional inside mirror is for the exclusive use of one type of a vehicle. Namely, although a tilting angle of an mounting surface with respect to the horizontal line is different according to types of vehicles, the conventional inside mirror can cope only with the mounting surface with a tilting angle in one type of a vehicle. For this reason, when one end of the stay of the conventional inside mirror is mounted to an mounting surface of a vehicle with different tilting angle, a predetermined or more tilting range of the mirror assembly cannot be obtained, and it is difficult to secure a rear field of view. Since the conventional inside mirror is for the exclusive use of one type of a vehicle, an inside mirror should be designed and manufactured for respective types of vehicles, and this causes a problem that the cost of an inside mirror becomes high.

SUMMARY OF THE INVENTION

It is an object of the present invention to provide an inside mirror that can be employed in different type of vehicles.

In the inside mirror according to one aspect of the present invention, a stay is provided with an axial portion and a spherical portion, meanwhile a bracket of a mirror assembly is provided with an opening and a spherical concave portion, the spherical portion of the stay and the spherical concave portion of the bracket are coupled tiltably by a fit structure so as to compose one pivot mechanism, an inner diameter of the opening of the bracket is larger than an outside dimension of the axial portion of the stay, a tilting range of the mirror assembly is set to a predetermined or more range, namely, such a range or more that even when a tilting angle of the mounting surface with respect to a horizontal line is different according to types of vehicles, a rear field of view can be secured.

As a result, even when the stay is mounted to the mounting surface with tilting angle different according to types of vehicles, the tilting range of the mirror assembly can be a predetermined or more range. For this reason, a rear field of view can be secured. Accordingly, in the aspect of the invention the inside mirror can be for the general-purpose use of types of vehicles with different tilting angles. For this reason, it is not necessary to design and manufacture the inside mirror according to types of vehicles, thereby lowering a cost of the inside mirror.

These and other objects, features and advantages of the present invention are specifically set forth in or will become apparent from the following detailed descriptions of the invention when read in conjunction with the accompanying drawings.

DETAILED DESCRIPTIONS

An embodiment of the inside mirror according to the present invention is explained below with reference to the accompanying drawings. The present invention is not limited by the embodiments.

As shown in the diagrams, an inside mirror 1 according to the embodiment is of a one pivot mechanism type that includes a stay 4 and a mirror assembly 5. One end 41 of the stay 4 is mounted to a mounting surface in a vehicle chamber so as to be capable of dropping via a mounting unit. The mirror assembly 5 is tiltably mounted to the other end of the stay 4 via one pivot mechanism.

The mounting surface in the vehicle chamber is, as shown in FIGS. 2, and 4 to 10, an inner surface of a front window seal glass (hereinafter, referred to as a front glass) FW1, FW2 or FW3, a tilting angle α of which with respect to a horizontal line H is different according to each type of vehicle. The tilting angle α of the front glass FW1, FW2 or FW3 is in a range of 20° to 40° in 90% or more of vehicles in Japan.

The mounting unit has a drop mechanism. As shown in FIGS. 1 to 4, the mounting unit having the drop mechanism includes a base 2, a spring member 3, and a screw S.

Figure 4:
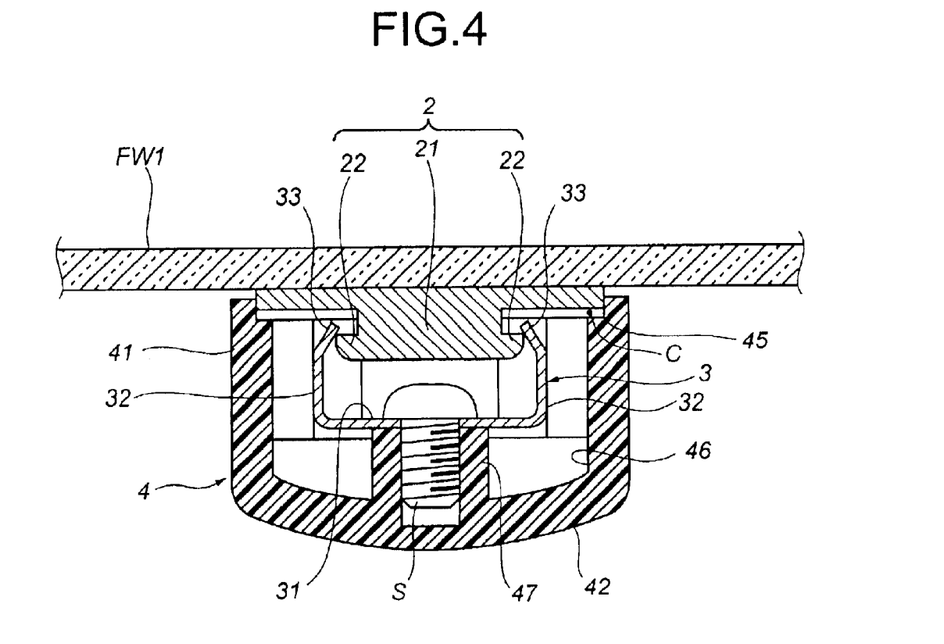
FIG. 4 is a cross-sectional view taken along line SA—SA shown in FIG. 2.
Figure 5:
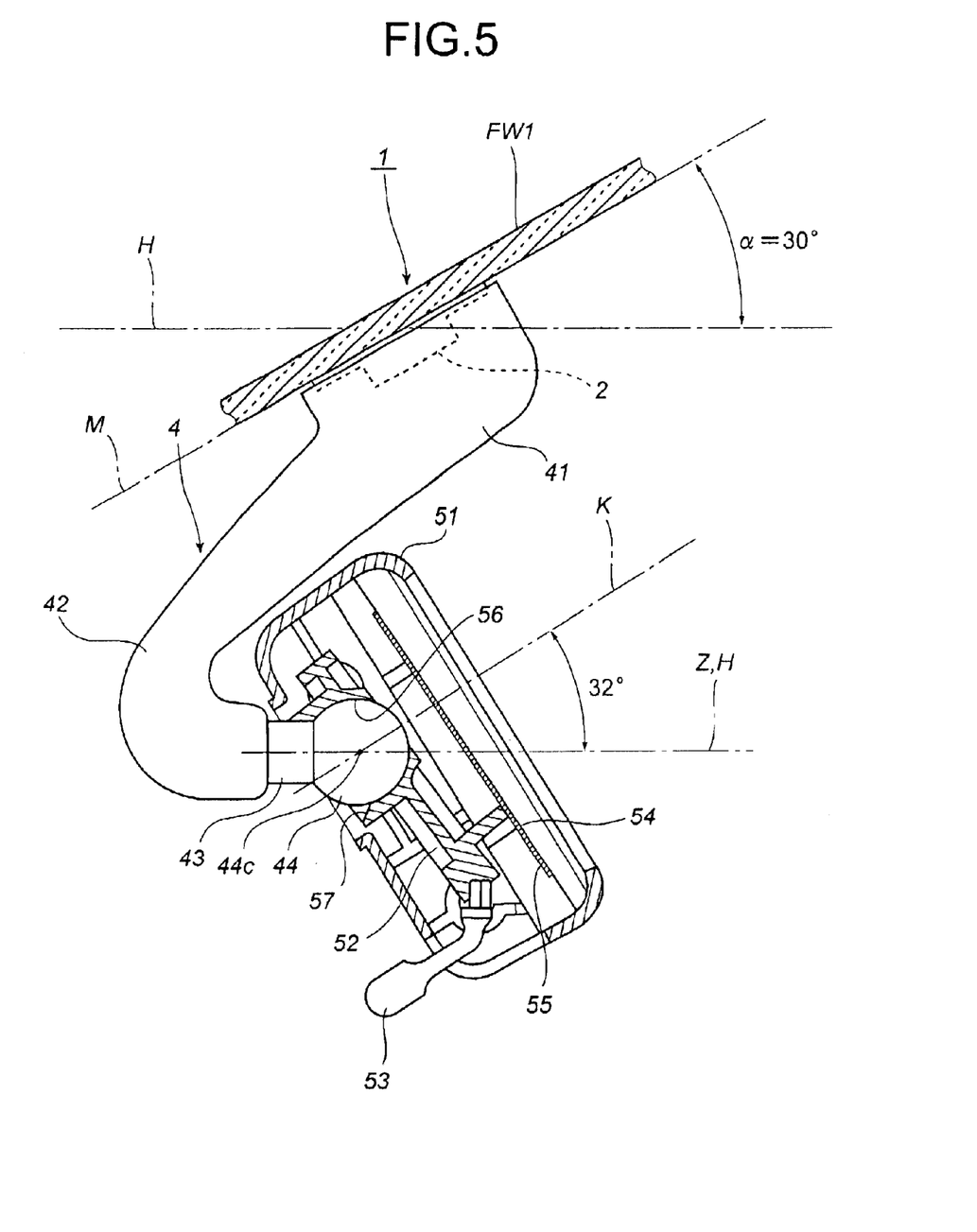
FIG. 5 is an explanatory diagram that shows a limit of an upward tilting range of a mirror assembly when a tilting angle of an mounting surface is 30°.
Figure 6:
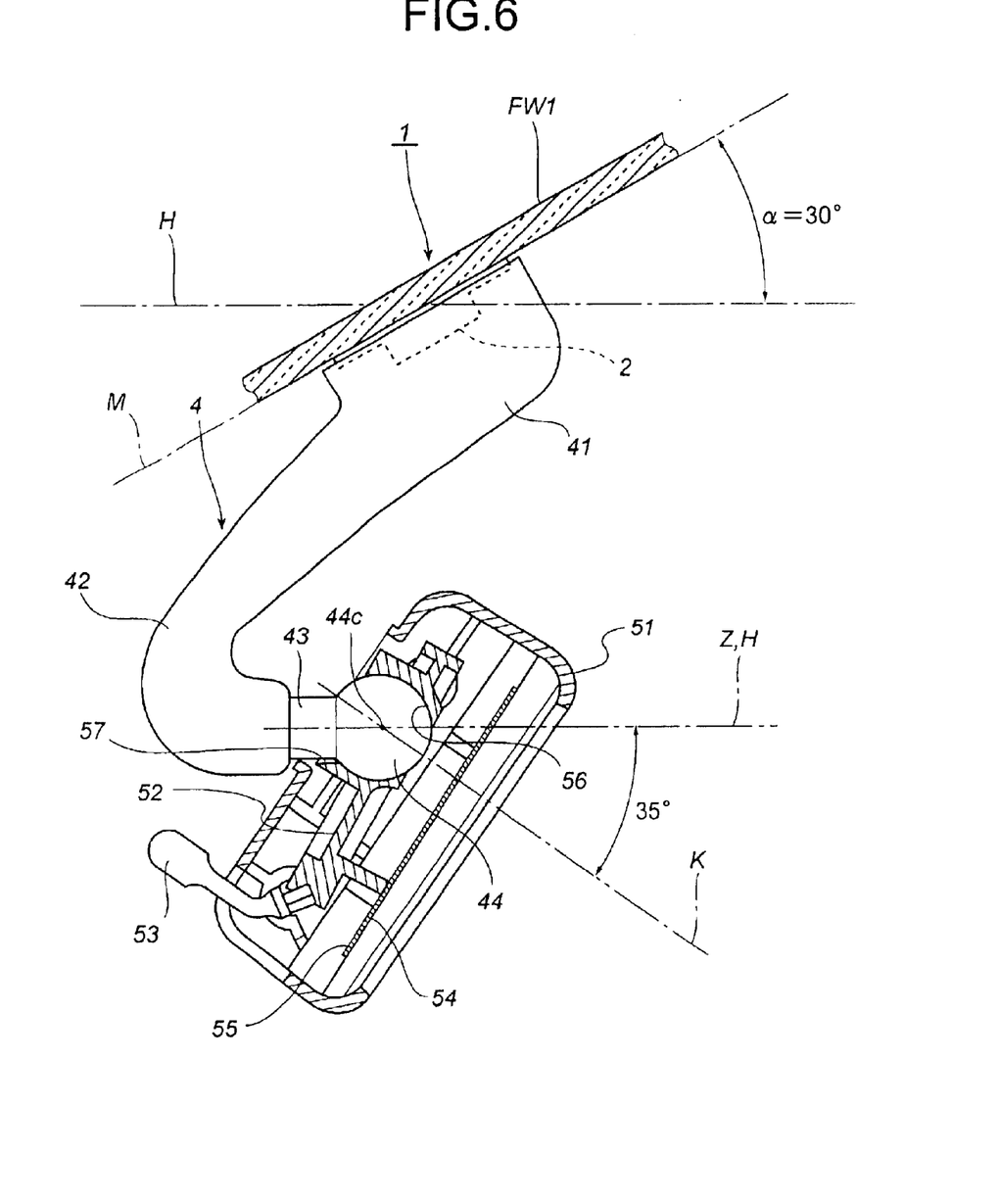
FIG. 6 is an explanatory diagram that shows a limit of a downward tilting range of the mirror assembly when the tilting angle of the mounting surface is 30°.
Figure 7:
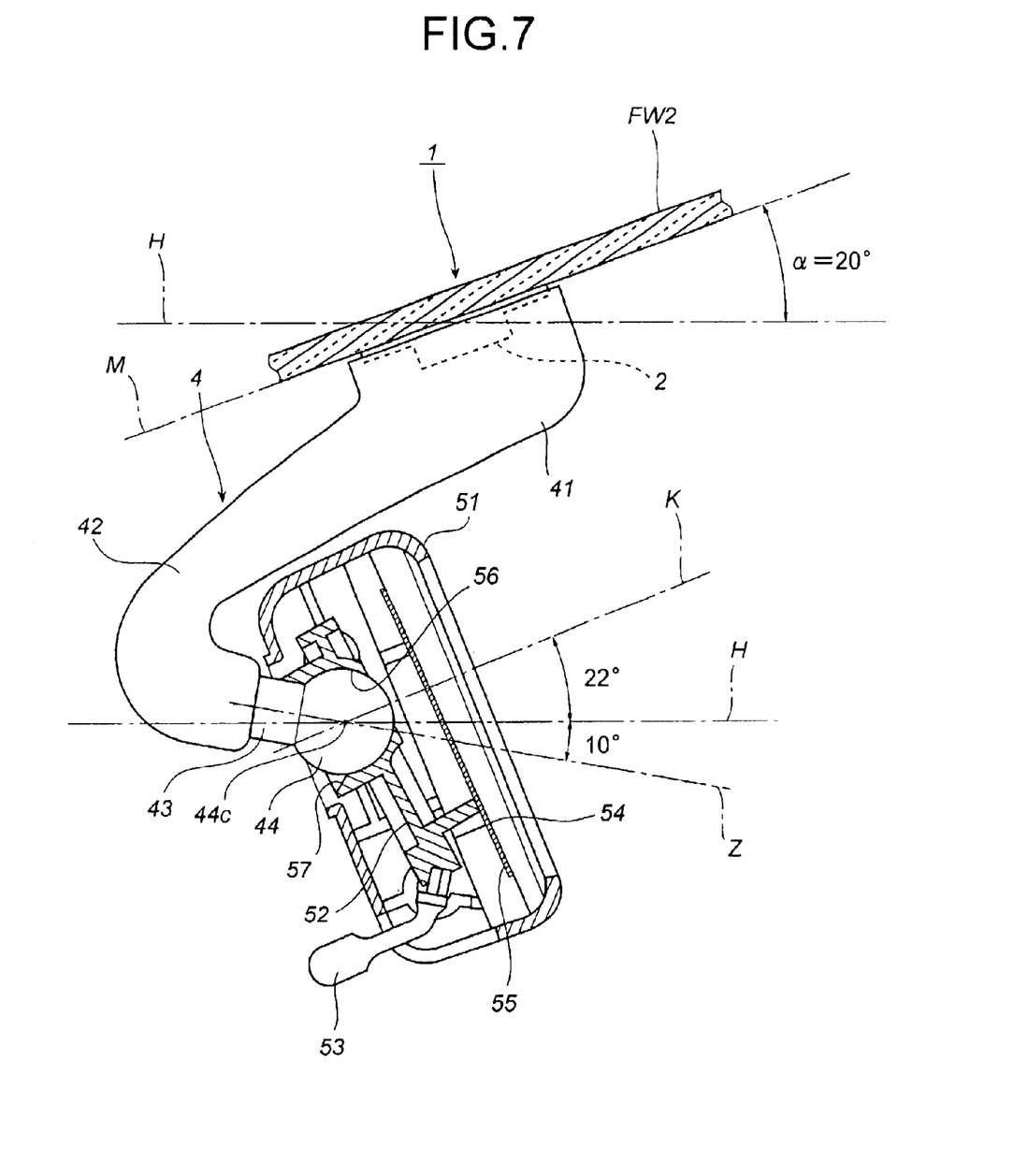
FIG. 7 is an explanatory diagram that shows a limit of an upward tilting range of the mirror assembly when the tilting angle of the mounting surface is 20°.
Figure 8:
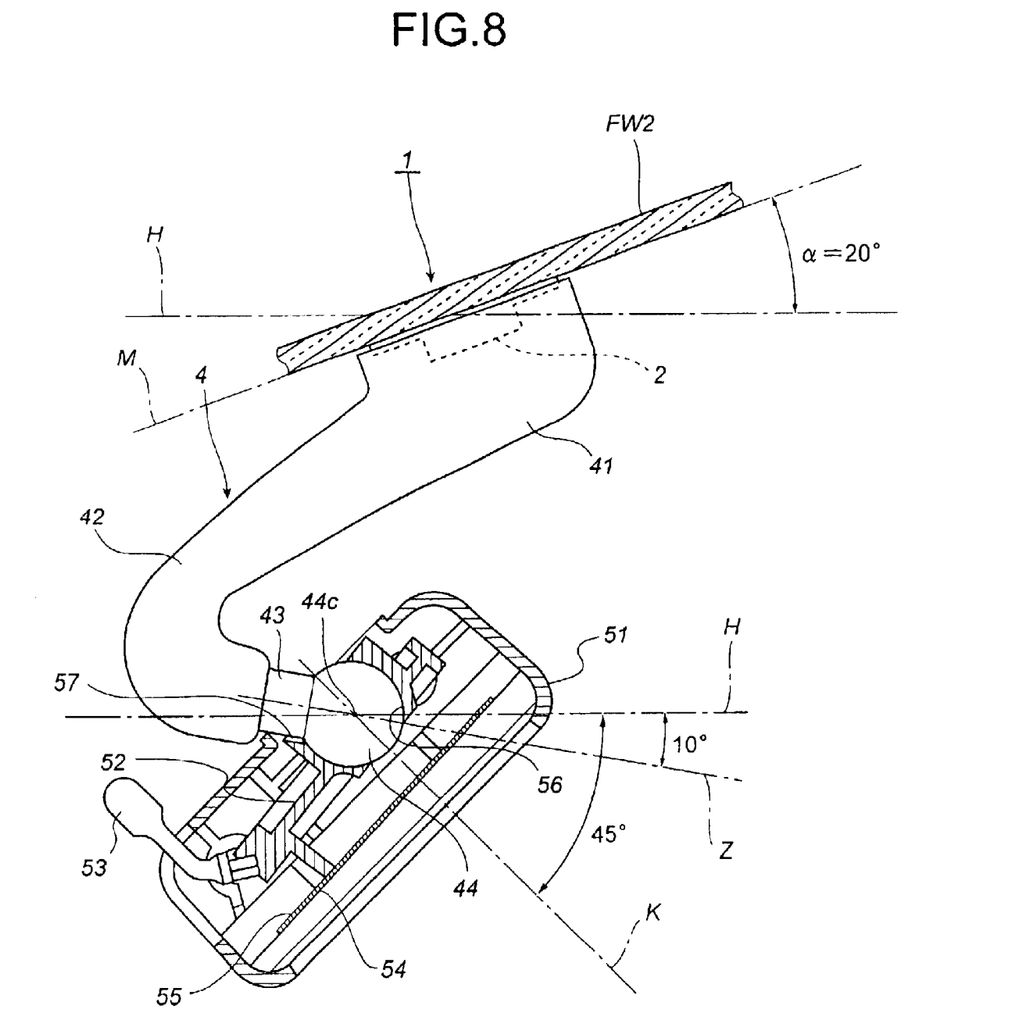
FIG. 8 is an explanatory diagram that shows a limit of a downward tilting range of the mirror assembly when the tilting angle of the mounting surface is 20°.
Figure 9:
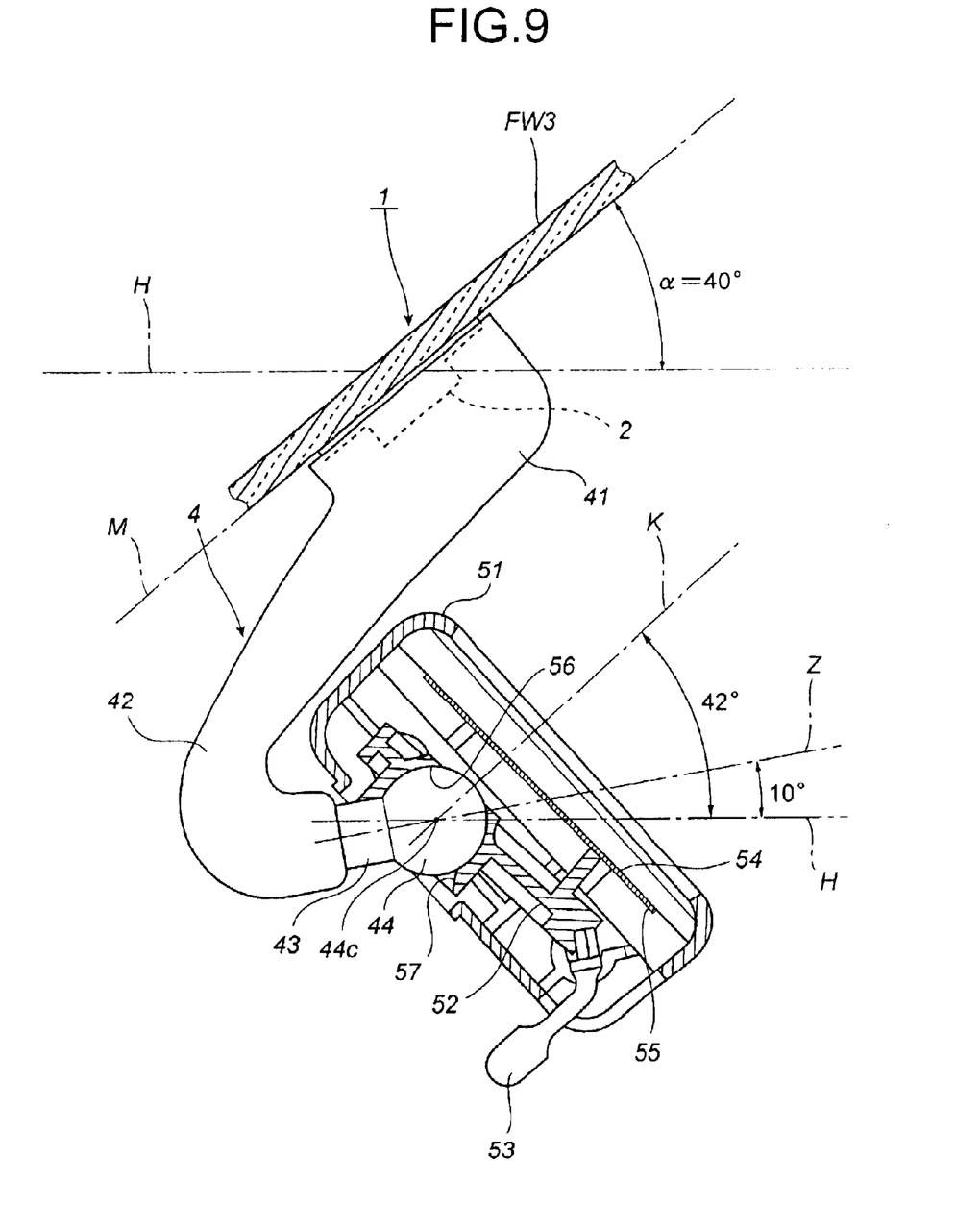
FIG. 9 is an explanatory diagram that shows a limit of an upward tilting range of the mirror assembly when the tilting angle of the mounting surface is 40°.
Figure 10:
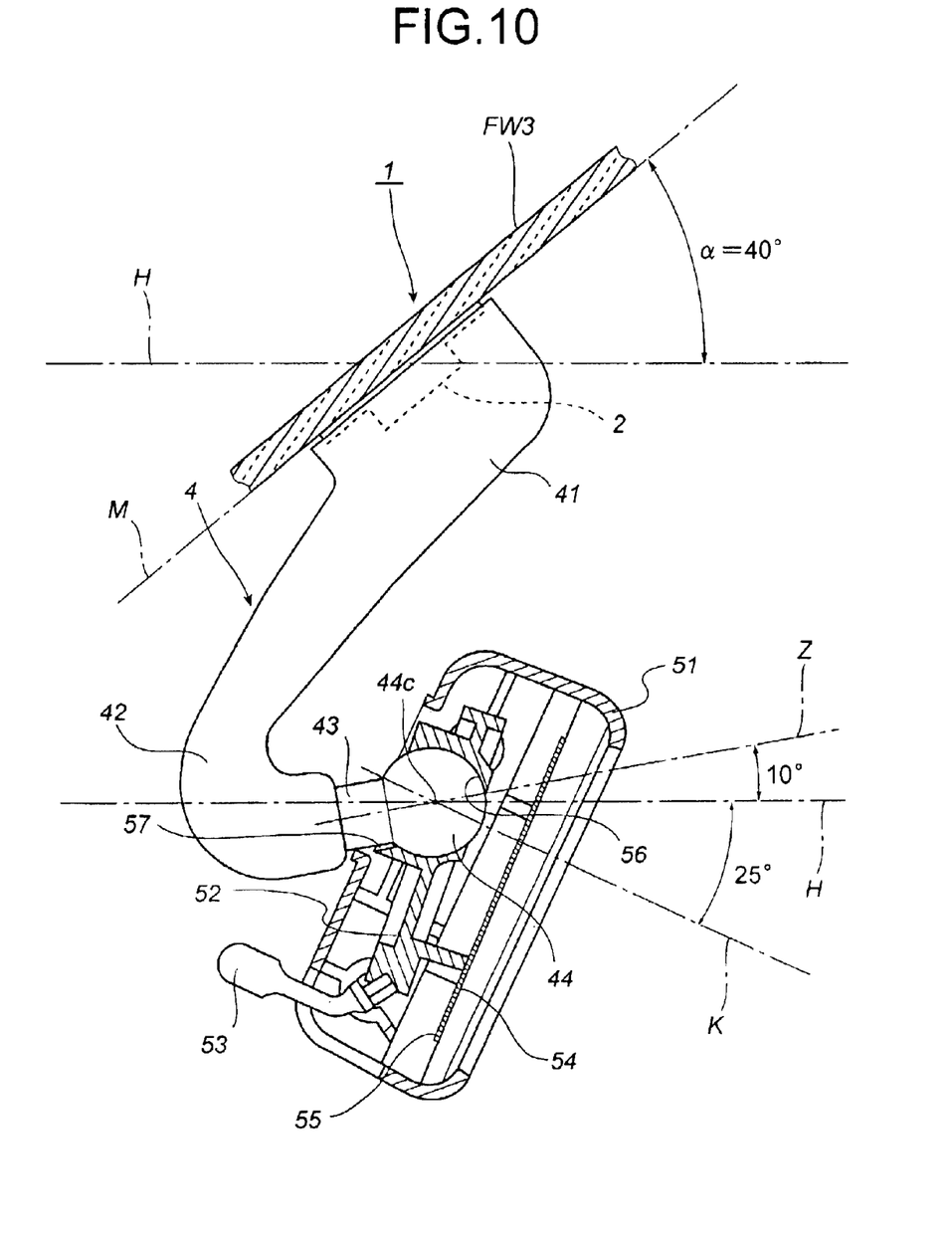
FIG. 10 is an explanatory diagram that shows a limit of a downward tilting range of the mirror assembly when the tilting angle of the mounting surface is 40°.

The base 2 is made of aluminum die cast, for example. As shown in FIG. 4, the base 2 includes a disc-shaped fixed section 21 and a pair of engaging sections 22 provided into approximately inverted T shape integrally onto one surface of the fixed section 21. The other surface of the fixed section 21 of the base 2 is adhered and fixed to a vicinity of an upper end at a center of the inner surface of the front glass FW1, FW2 or FW3 in an axial direction by adhesive (not shown). As the adhesive, for example, a both face adhesive, in which an adhesive is applied to its one face to adhere to glass and an adhesive is applied to the other face to adhere to metal, is used.

Figure 3:
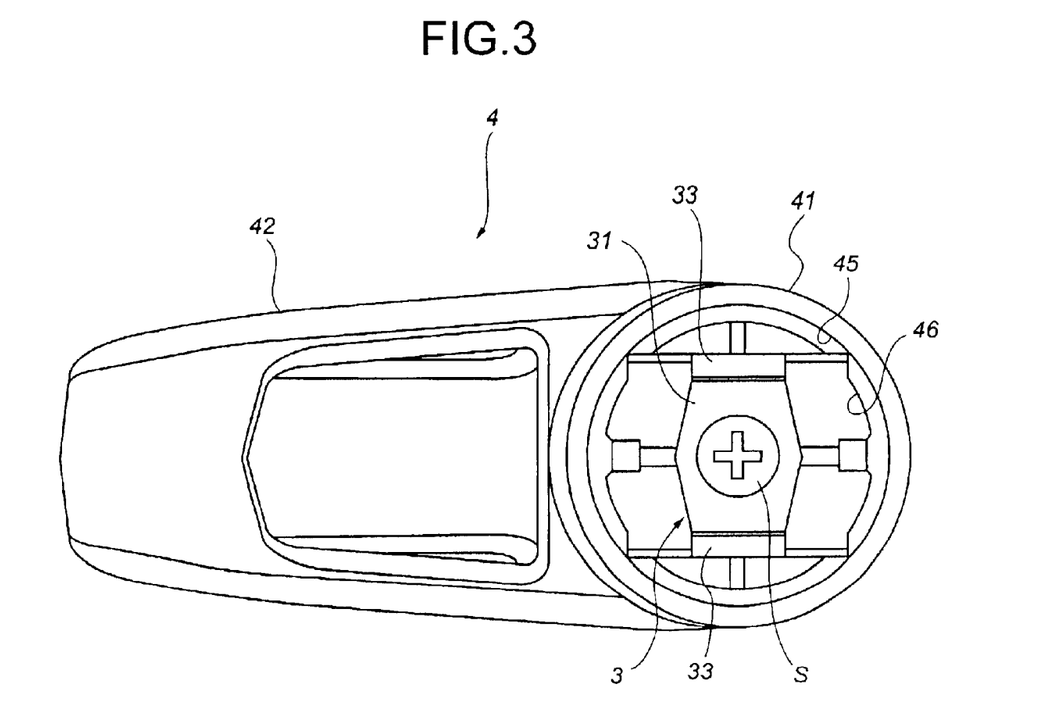
FIG. 3 is a view in the direction of line C1—C1 shown in FIG. 2.

The spring member 3 is, for example, a metal plate having elasticity that undergoes a surface coating process. The spring member 3 includes, as shown in FIGS. 3 and 4, a fixed section 31, a pair of flexible sections 32, 32 and a pair of hook sections 33, 33. The flexible sections 32, 32 are provided integrally to both sides of the fixed section 31, respectively, by bending them at right angles. The hook sections 33, 33 are formed by bending front ends of the flexible sections 32, 32 inwardly. The fixed section 31 of the spring member 3 is fixed to the one end 41 of the stay 4 by the screw S.

The hook sections 33, 33 of the spring member 3 are engaged with the engaging sections 22, 22 of the base 2, so that the one end 41 of the stay 4 is mounted to the inner surface of the front glass FW1, FW2 or FW3 via the mounting unit having the drop mechanism so as to be capable of dropping. When a separating force acts in the engaged state of the engaging sections 22, 22 of the base 2 and the hook sections 33, 33 of the spring member 3, the flexible sections 32, 32 of the spring member 3 are extended to be deformed, and the engaged state of the engaging sections 22, 22 of the base 2 and the hook sections 33, 33 of the spring member 3 is released. As a result, the stay 4 and the mirror assembly 5 drop from the inner surface of the front glass FW1, FW2 or FW3.

The stay 4 is made of, for example, synthetic resin. The stay 4 includes a stay main body 42 having an approximately L shape from the one end 41 to the other end. The mounting surface of the one end 41 of the stay 4 (stay main body 42) is provided with a circular concave portion 45 for locating. An inner diameter of the circular concave portion 45 is slightly larger than an outer diameter of the fixed section 21 of the base 2. While a predetermined clearance C is left between an upper surface of the concave portion 45 and a lower surface of the fixed section 21, an inner surface of the concave portion 45 bumps against an outer surface of the fixed section 21, thereby determining the mounting position of the stay 4. The one end 41 of the stay 4 is provided with a housing section 46 having a concave shape that continues from the concave portion 45. The housing section 46 houses the base 2, the spring member 3 and the screw S. At the one end 41 of the stay 4, a boss section 47 is provided integrally to a bottom portion of the housing section 46. The screw S is screwed into the boss section 47, so that the spring member 3 is fixed to the one end 41 of the stay 4.

The other end of the stay 4 (stay main body 42) is provided integrally with a round bar shaped axial portion 43. A front end of the axial portion 43 is provided integrally with a spherical portion 44.

Figure 1:
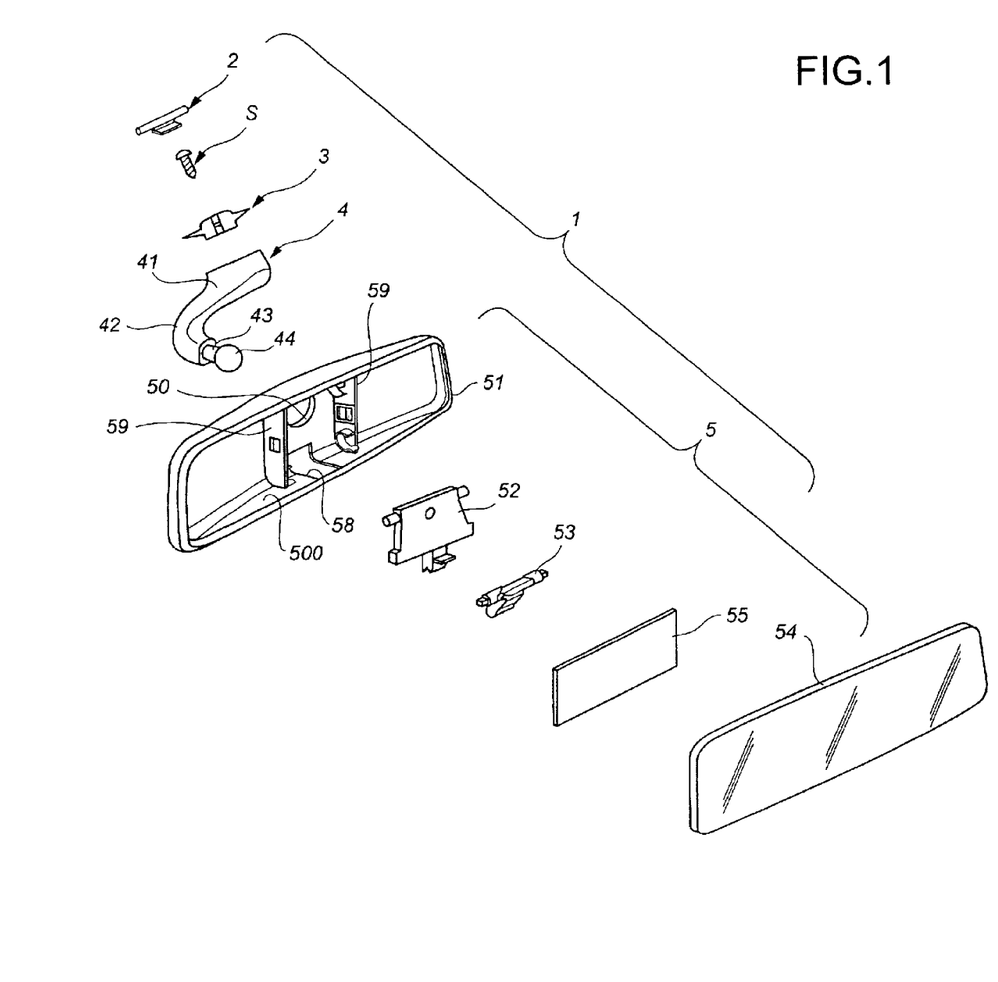
FIG. 1 is an exploded perspective view that shows an inside mirror according to an embodiment of the present invention.
Figure 2:
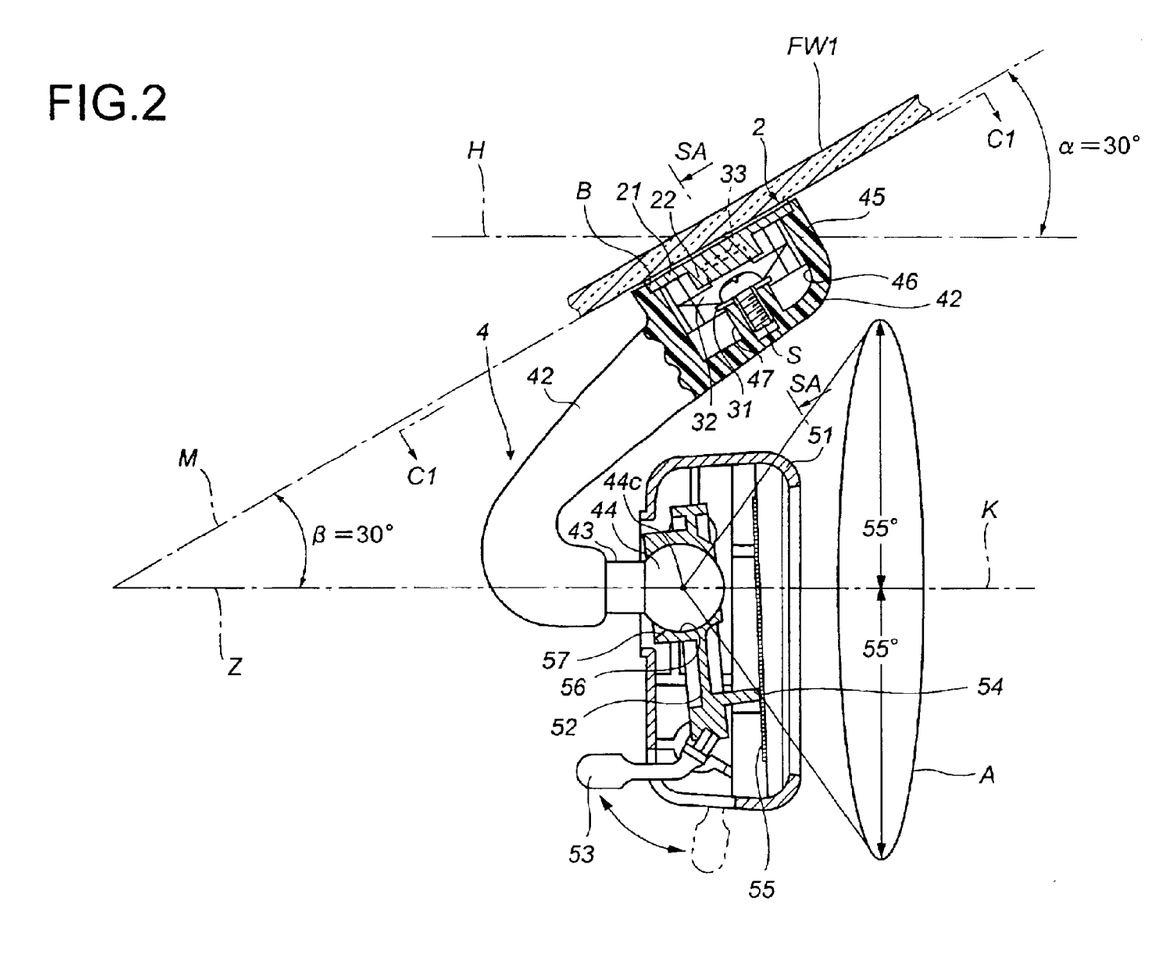
FIG. 2 is a cross-sectional view of the inside view and shows the main parts of the inside mirror in a mounted state.

The stay 4, namely, the stay main body 42 having approximately L shape is, as shown in FIG. 2, constituted so that an angle β between an extended line M from the mounting surface of the one end 41 and an axial line Z of the axial portion 43 passing through a center 44c of the spherical portion 44 becomes about 30°. As a result, when the one end 41 is mounted to the inner surface of the front glass FW1 with a tilting angle α of 30°(30° is an average tilting angle of the front glass FW1, FW2 or FW3 different according to types of vehicles) via the mounting unit, the axial line Z becomes approximately parallel with the horizontal line H. Namely, the stay main body 42 is along the front glass FW1, FW2 or FW3, and the axial portion 43 and the spherical portion 44 direct backward and horizontally.

Since the stay 4 has the structure, the inner surface of the concave portion 45 for determining the mounting position and the outer surface of the fixed section 21 of the base 2 are, as shown in FIG. 2, positioned outside the range of a cone A. The cone A has a conic shape with a generating angle of 55° in which the center 44c of the spherical portion 44 is an apex and a normal K (the axial line Z) of a reflecting surface (a rear surface of a mirror 54) of the mirror assembly 5 is an axial line and the bottom surface is a rear side.

The mirror assembly 5 includes a mirror housing 51, a bracket 52, a knob 53, and the mirror 54.

The mirror housing 51 is, for example, made of synthetic resin. The mirror housing 51 has a hollow housing shape in which its front side is blocked and its rear side is opened. An approximately center of the front side of the mirror housing 51 is provided with a circular stay through hole 50. Meanwhile, the rear side of the mirror housing 51 is provided with an approximately oblong mirror opening 500. An approximately middle portion from a lower portion on the rear side of the mirror housing 51 to the bottom portion is provided with a square knob through hole 58. Two ribs 59 are provided integrally inside the mirror housing 51.

The mirror 54 is, for example, made of glass. The mirror 54 is a so-called prism mirror, top surface and bottom surface of which are not parallel but are slightly tilted. The bottom surface of the mirror 54 is provided with a reflecting film (not shown) by aluminization or aluminum bronze paint and provided with a tape 55 made of kraft paper. The mirror 54 is fitted to be fixed into an edge of the mirror opening 500 of the mirror housing 51.

The bracket 52 and the knob 53 are, for example, made of synthetic resin. The bracket 52 and the knob 53 are housed in the mirror housing 51 and are axially supported to the ribs 59 rotatively. Moreover, the bracket 52 and the knob 53 are engaged with each other. When the knob 53 is switched between a state indicated by a solid line and a state indicated by an alternate long and two short dashes line, the mirror housing 51 and the mirror 54 tilts with respect to the bracket 52 via the bracket 52. As a result, reflectance of the mirror 54 is switched between day use and night use. In such a manner, the bracket 52 and the knob 53 compose an anti-dazzle switching mechanism.

Figure 12:
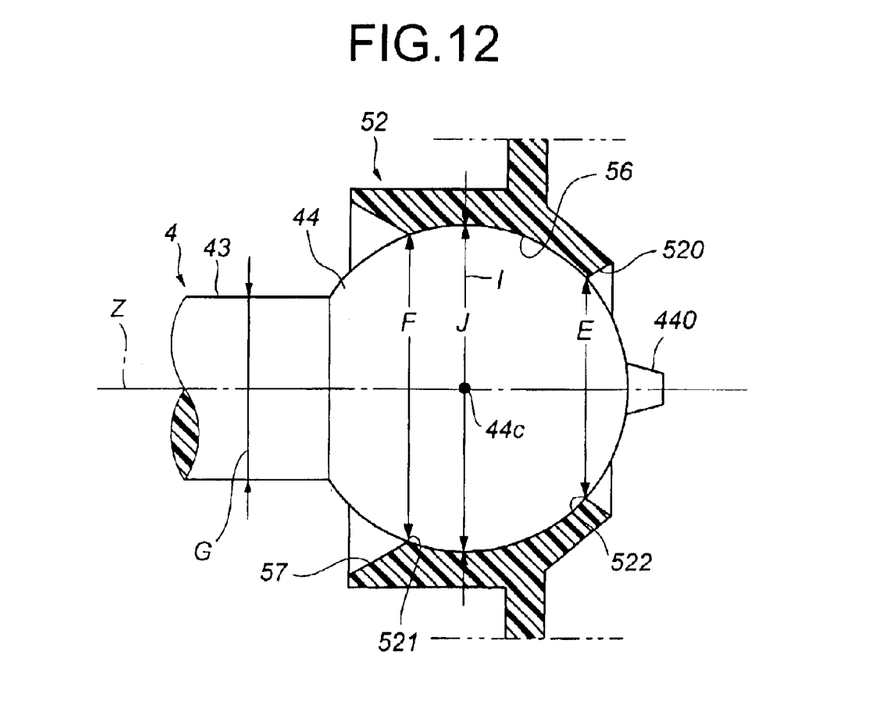
FIG. 12 is an explanatory diagram that shows a dimensional relationship of a pivot mechanism.

As shown in FIG. 12, the bracket 52 is provided with a circular first opening 521, a spherical concave portion 56, and a second opening 522 from the front side to the rear side. The spherical concave portion 56 of the bracket 52 and the spherical portion 44 of the stay 4 are coupled with each other tiltably by a fit structure (close fit structure) in which the spherical portion 44 passes through the stay through hole 50 of the mirror housing 51 and is pressed into the spherical concave portion 56 through the first opening 521. The axial portion 43 and the spherical portion 44 of the stay 4, and the bracket 52 compose the pivot mechanism.

An edge of the first opening 521 of the bracket 52 is provided with a tilting range limiter 57 for bumping against the axial portion 43 of the stay so as to limit the tilting range of the mirror assembly 5. As shown in FIG. 12, the tilting range limiter 57 tilts so that its inner diameter becomes larger from an inside to an outside on the side of the spherical concave portion 56. As shown in FIG. 12, auxiliary tilting range limiters 520 and 440 may be provided to the edge of the second opening 522 of the bracket 52 and the spherical portion 44 of the stay 4, respectively. The auxiliary tilting range limiters 520, 440 bump against the edge of the second opening 522 and the spherical portion 44 of the stay 4 so as to limit the tilting range of the mirror assembly 5. An inner diameter E of the second opening 622 is smaller than an inner diameter F of the first opening 521.

The axial portion 43 of the stay 4 has an outside dimension G (in this example, diameter, about 10 mm) that can provide a minimum required strength for mounting the mirror assembly 5 via the pivot mechanism. The tilting range limiter 57, namely, an inner diameter F of the first opening 521 (in this example, inner diameter, about 15.6 mm) is larger than the outside dimension G of the axial portion 43 of the stay 4. An outer diameter I of the spherical portion 44 of the stay 4 (in this example, outer diameter, about 16.8 mm) is slightly larger than an inner diameter J of the spherical concave portion 56 of the bracket 52 (in this example, inner diameter, about 16.5 mm). As a result, the spherical portion 44 of the stay 4 and the spherical concave portion 56 of the bracket 52 compose the fit structure.

A size condition of the tilting range limiter 57, namely, the inner diameter F of the first opening 521 is such that a fitting amount for establishing the fit structure of the spherical portion 44 of the stay 4 and the spherical concave portion 56 of the bracket (an amount for fitting the spherical portion 44 into the spherical portion 56) can be secured, and even when the tilting angle α of the front glass FW1, FW2 or FW3 differs according to types of vehicles, the tilting range of the mirror assembly 5 for obtaining the rear field of view can be secured. Within the tilting range of the mirror assembly 5 in this example, when the inside mirror 1 according to the embodiment is mounted to the inner surface of the front glass FW1 with average tilting angle of 30°, the normal K of the reflecting surface of the mirror assembly 5 tilts 22° to 32° upward (in this example, 32°) and 25° to 35° downward (in this example, 35°) with respect to the horizontal line (the axial portion 43 of the stay 4 and the axial line Z of the spherical portion 44).

Effects of the inside mirror according to the embodiment is explained bellow.

When the inside mirror 1 is mounted to the inner surface of the front glass FW1 with tilting angle α of 30°, the axial line Z of the stay 4 coincides with the horizontal line H. In this case, a position, where the normal K of the reflecting surface of the mirror assembly 5 is adjusted to the axial line Z of the stay 4 and the horizontal line H, is a neutral position. The mirror assembly 5 can be tilted 32° upward (see FIG. 5) and 35° downward (see FIG. 6) from the neutral position. Namely, the normal K of the reflecting surface of the mirror assembly 5 can be tilted 32° upward and 35° downward with respect to the axial line Z of the stay 4 and the horizontal line H.

When the inside mirror 1 is mounted to the inner surface of the front glass FW2 with tilting angle α of 20°, the axial line Z of the stay 4 tilts 10° downward with respect to the horizontal line H. In this case, a position, where the normal K of the reflecting surface of the mirror assembly 5 is adjusted to the horizontal line H, is a neutral position. The mirror assembly 5 can be tilted 22° upward (see FIG. 7) and 45° downward (see FIG. 8) from the neutral position. Namely, the normal K of the reflecting surface of the mirror assembly 5 can be tilted 22° upward and 45° downward with respect to the horizontal line H.

When the inside mirror 1 is mounted to the inner surface of the front glass FW3 with tilting angle α of 40°, the axial line Z of the stay 4 tilts 10° upward with respect to the horizontal line H. In this case, a position, where the normal K of the reflecting surface of the mirror assembly 5 is adjusted to the horizontal line H, is a neutral position. The mirror assembly 5 can be tilted 42° upward (see FIG. 9) and 25° downward (see FIG. 10) from the neutral position. Namely, the normal K of the reflecting surface of the mirror assembly 5 can be tilted 42° upward and 25° downward with respect to the horizontal line H.

In the inside mirror 1 according to the embodiment, even when the one end 41 of the stay 4 is mounted to the inner surface of the front glass FW1 (tilting angle α is 30°), FW2 (tilting angle α is 20°) or FW3 (tilting angle α is 40°) with different tilting angles α according to types of vehicles, the tilting angle of the mirror assembly 5 is 32° upward to 35° downward, or 22° upward to 45° downward or 42° upward to 25° downward, namely, a predetermined or more range can be obtained. As a result, in the inside mirror 1 according to the embodiment, almost all drivers can secure the rear field of view regardless of their figure, physique and posture. Thus, the inside mirror 1 according to the embodiment can be for general-purpose use of different types of vehicles, in which the tilting angle α of the front glass FW1, FW2 or FW3 is different in the range of 20° to 40°. For this reason, the inside mirror 1 according to the embodiment does not have to be designed and manufactured for each type of vehicles, thereby making the cost inexpensive.

In the inside mirror 1 according to the embodiment, the one end 41 of the stay 4 is mounted to the mounting surface in the vehicle chamber via the mounting unit so as to be capable of dropping, when an external force of predetermined value or more is applied to the mirror assembly 5, the mirror assembly 5 and the stay 4 drop from the mounting surface. Namely, when an external force of predetermined value or more is applied to the mirror assembly 5, the inner surface of the concave portion 45 of the stay 4 and the outer surface of the fixed section 21 of the base 2 bump against each other at a point B in FIG. 2. A separating force, namely, a rotational moment acts upon the engaging sections 22, 22 of the base 2 and the hook sections 33, 33 of the spring member 3, which are in the engaged state where the point B is a drop supporting point (rotational supporting point). As a result, the flexible sections 32, 32 of the spring member 3 are extended to be deformed, and the engagement state between the engaging sections 22 22 of the base 2 and the hook sections 33, 33 of the spring member 3 is released, so that the stay 4 and the mirror assembly 5 drop from the inner surface of the front glass FW1, FW2 or FW3. For this reason, the inside mirror 1 according to the present embodiment absorbs a shock when a rider hits his/her head or the like against the mirror at the time of suddenly stopping and shunting a vehicle.

Figure 11:
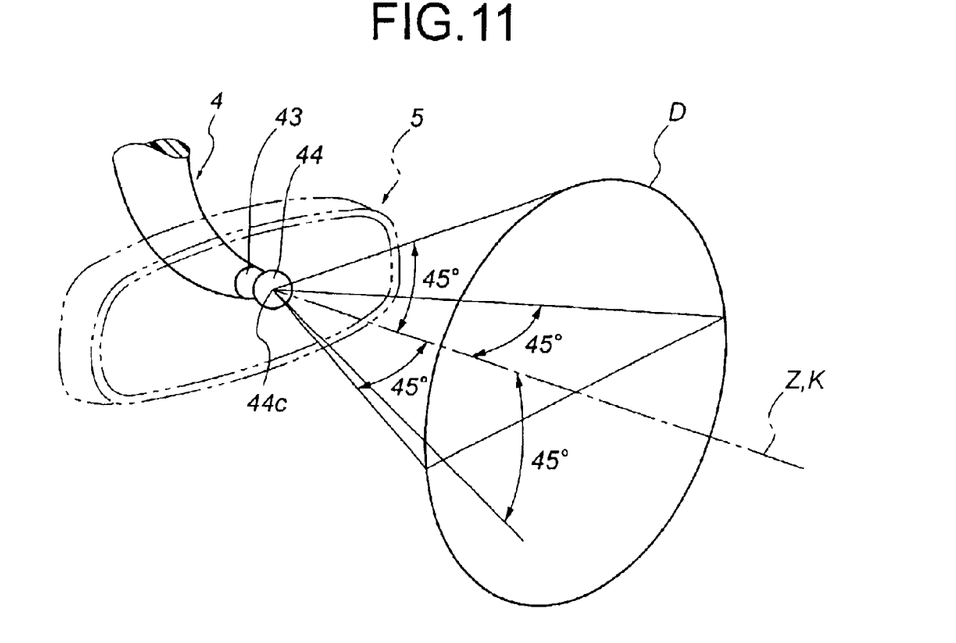
FIG. 11 is an explanatory diagram that shows a static test in shock absorbing type back mirror in Japan.

The shock absorbing is defined by the law of the shock absorbing in Japan. According to the law, as show in FIG. 11 (explanatory diagram of a static test in a shock absorbing type back mirror), such a structure that when a shock with a predetermined value or more is applied to the mirror assembly 5 from the range of the cone D, the mirror assembly 5, and the stay 4 drop from the mounting surface is required. The cone D has a conical shape with a generating angle of 45° in which the center 44c of the spherical portion 4 of the stay 4 is an apex and the normal K (axial line Z of the stay 4) of the reflecting surface of the mirror assembly 5 is an axial line and the bottom surface is a rear side.

In the inside mirror 1 according to the embodiment, the drop supporting point (rotational supporting point) B at the time of shock absorbing between the inner surface of the concave portion 45 of the stay 4 and the outer surface of the fixed section 21 of the base 2 is positioned outside the range of the cone A as shown in FIG. 2. Further, the cone A has a conical shape with generating angle of 55° in which the center 44c of the spherical portion 44 of the stay 4 is an apex and the normal K (axial line Z of the stay 4) of the reflecting surface of the mirror assembly 5 is an axial line and the bottom surface is a rear side. As a result, even when the inside mirror 1 according to the embodiment is mounted to the inner surface of the front glass FW1 (tilting angle α is 30°), FW2 (tilting angle α is 20°) or FW3 (tilting angle α is 40°) with different tilting angles (x according to types of vehicles, the drop supporting point (rotational supporting point) B is always positioned out of the range of the cone D. As a result, when the inside mirror 1 according to the embodiment is mounted to the inner surface of the front glass FW1, FW2 or FW3 with tilting angle α of 20° to 40°, it can sufficiently satisfy the law of the shock absorbing in Japan.

Particularly the inside mirror 1 according to the embodiment tilts so that the inner diameter of the tilting range limiter 57 becomes larger from the inside to the outside of the spherical portion 56. For this reason, the spherical portion 44 of the stay 4 is easily pressing into the spherical concave portion 56 through the tilting range limiter 57 (first opening 521) of the bracket 52, and the fit structure of the spherical portion 44 and the spherical concave portion 56 is secured.

The inside mirror 1 according to the embodiment is provided with the auxiliary tilting range limiters 520 and 440 for bumping against the edge of the second opening 522 of the bracket 52 and the spherical portion 44 of the stay 4 so as to limit the tilting range of the mirror assembly 5. For this reason, the tilting range of the mirror assembly 5 can be limited securely by the synergistic effect of the tilting range limiter 57 and the tilting range limit function at the axial portion 43 and the mirror assembly 5.

In the inside mirror 1 according to the embodiment, the inner diameter of the second opening 522 of the bracket 52 is smaller than the inner diameter of the first opening 521. For this reason, when the spherical portion 44 of the stay 4 is pressed into the spherical concave portion 56 through the first opening 521 of the bracket 52, the spherical portion 44 does not drop from the second opening 522 and can be pressed thereinto securely.

Examples other than the embodiment are explained.

In this embodiment, when the one end 41 of the stay 4 is mounted to the inner surface of the front glass FW1 with tilting angle α of 30°, namely, average tilting angle, the stay 4 having such a structure that the axial line Z of the stay 4 is approximately parallel with the horizontal line H is used, and the tilting range of the mirror assembly 5 is within the range of 32° upward and 35° downward with respect to the horizontal line H (axial line Z of the stay 4). However, this invention is not limited to the stay 4 having the structure and the tilting range of the mirror assembly 5.

For example, the tilting range of the mirror assembly 5 may be within the range of 22° upward and 25° downward with respect to the horizontal line H (axial line Z of the stay 4). In this case, when the inside mirror 1 is mounted to the front glass FW2 with the tilting angle α of 20°, the tilting range of the mirror assembly 5 of 12° upward and 35° downward can be obtained. When the inside mirror 1 is mounted to the front glass FW3 with the tilting angle α of 40°, the tilting range of the mirror assembly of 32° upward and 15° downward can be obtained. As a result, the tilting range of the mirror assembly 5 can be a predetermined or more tilting range (12° upward and 15° downward).

In the present embodiment, the tilting range limiter 57 is structured so that the inner diameter is larger from the inside to the outside on the side of the spherical concave portion 56. However, the tilting range limiter 57 is not necessarily tilted.

In the embodiment, the edge of the second opening 522 of the bracket 52 and the spherical portion 44 of the stay 4 are provided with the auxiliary tilting range limiters 520 and 440 for bumping against them so as to limit the tilting range of the mirror assembly 5. However, the auxiliary tilting range limiters 520 and 440 do not have to be provided.

In the embodiment, the inner diameter of the second opening 522 of the bracket 52 is smaller than the inner diameter of the first opening 521, but in this invention the inner diameter of the second opening 522 may be approximately the same as or larger than the inner diameter of the first opening 521.

In the embodiment, the mounting surface in the vehicle chamber is the inner surface of the front glass FW1, FW2 or FW3, but may be an inner surface of a front roof panel.

In the embodiment, the one end 41 of the stay 4 is mounted to the mounting surface via the mounting unit having the drop mechanism so as to be capable of dropping. However, not the drop type shock absorbing mechanism but a displacement type shock absorbing mechanism may be adopted.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An inside rearview mirror apparatus for a vehicle, comprising:
    a mirror assembly having a mirror, a bracket with an opening formed at the back of the mirror and provided with an edge, and a spherical concave portion inside the opening, the edge of the opening being provided with a tilting range limiter; and
    a stay having a first end and a second end, the first end having a mounting unit for mounting the stay to a mounting surface which is one of an inner surface of a windshield or an inner surface of a front roof panel and the second end including a one-pivot type mechanism having an axial portion and a spherical portion provided at an end of the axial portion, wherein the axial portion is configured such that an angle formed between a horizontal line and an axis of the axial portion is within 10 degrees upward or 10 degrees downward, under a condition where the mounting surface has a tilting angle of 20 to 40 degrees, and the stay is attached to the mounting surface via the mounting unit, the spherical portion of the stay is inserted in the opening of the bracket and coupled with the spherical concave portion so that the mirror assembly is located under the mounting unit under the condition where the stay is mounted to the mounting surface having a tilting angle of 20 to 40 degrees, the tilting range limiter limits the tilting range of the axial portion of the stay thereby controlling a tilting range of the mirror assembly, and the tilting range limiter has a configuration capable of adjusting the tilting range of the mirror assembly enough to obtain a view of the rear side of the vehicle under the condition where the mounting surface has a tilting angle of 20 to 40 degrees.

2. The inside rearview mirror apparatus according to claim 1, wherein the tilting range limiter tilts so that its inner diameter becomes larger from an inside to an outside on the side of the spherical concave portion.

3. The inside rearview mirror apparatus according to claim 1, wherein the one end of the stay in mounted to the mounting surface so as to be capable of dropping via a mounting unit having a drop mechanism.

4. The inside rearview mirror apparatus according to claim 3, wherein when the one end of the stay is mounted to the mounting surface with an average tilting angle, a drop supporting point of the drop mechanism at the time of dropping is positioned outside the range of a conical shape having a generating angle of 55° in which a center of the spherical portion is an apex, the normal of the reflecting surface of the mirror assembly is an axial line and a bottom surface is a rear side.

5. An inside rearview mirror apparatus for a vehicle, comprising:

a mirror assembly having a mirror, a bracket with an opening formed at the back of the mirror and provided with an edge, and a spherical concave portion inside the opening, the edge of the opening being provided with a tilting range limiter; and a stay having a first end and a second end, the first end having a mounting unit for mounting the stay to a mounting surface which is one of an inner surface of a windshield or an inner surface of a front roof panel and the second end including a one-pivot type mechanism having an axial portion and a spherical portion provided at an end of the axial portion, wherein the axial portion is configured such that an angle formed between a horizontal line and an axis of the axial portion is within 10 degrees upward or 10 degrees downward, under a condition where the mounting surface has a tilting angle of 20 to 40 degrees, and the stay is attached to the mounting surface via the mounting unit, the spherical portion of the stay is inserted in the opening of the bracket and coupled with the spherical concave portion so that the mirror assembly is located under the mounting unit under the condition where the stay is mounted to the mounting surface having a tilting angle of 20 to 40 degrees, the tilting range limiter limits the tilting range of the axial portion of the stay thereby controlling a tilting range of the mirror assembly, and the tilting range limiter has a configuration capable of adjusting the tilting range of the mirror assembly enough to obtain a view of the rear side of the vehicle under the condition where the mounting surface has a tilting angle of 20 to 40 degrees, the stay is structured so that when its first end is mounted to the mounting surface with an average tilting angle, an axis of the axial portion passes through a center of the spherical portion and the axis is parallel to the horizontal line, and the tilting range of the mirror assembly is such that a normal of a reflecting surface of the mirror assembly tilts 22° to 32° upward and 25° to 35° downward with respect to the horizontal line.

6. An inside rearview mirror apparatus for a vehicle having a windshield and a front roof panel, comprising:

a mirror assembly having a mirror, a bracket with an opening formed at the back of the mirror and provided with an edge, and a spherical concave portion inside the opening, the edge of the opening being provided with a tilting range limiter; and a stay having a first end and a second end, the first end having a mounting unit for mounting the stay to a mounting surface which is one of an inner surface of the windshield or an inner surface of the front roof panel and the second end including a one-pivot type mechanism having an axial portion and a spherical portion provided at an end of the axial portion, wherein the axial portion is configured such that an angle formed between a horizontal line and an axis of the axial portion is within 10 degrees upward or 10 degrees downward, under a condition where the mounting surface has a tilting angle of 20 to 40 degrees, and the stay is attached to the mounting surface via the mounting unit, the spherical portion of the stay is inserted in the opening of the bracket and coupled with the spherical concave portion so that the mirror assembly is located under the mounting unit under the condition where the stay is mounted to the mounting surface having a tilting angle of 20 to 40 degrees, the tilting range limiter limits the tilting range of the axial portion of the stay thereby controlling a tilting range of the mirror assembly, and the tilting range limiter has a configuration capable of adjusting the tilting range of the mirror assembly enough to obtain a view of the rear side of the vehicle under the condition where the mounting surface has a tilting angle of 20 to 40 degrees, the bracket of the mirror has an other opening opposite to the opening into which the spherical portion of the stay is inserted, the other opening having an edge, the edge of the other opening of the bracket and the spherical portion of the stay are provided with auxiliary tilting range limiters that limit the tilting range of the mirror assembly, respectively.

7. The inside rearview mirror apparatus according to claim 6, wherein an inner diameter of the other opening is smaller than an inner diameter of the opening into which the spherical portion of the stay is inserted.

* * * * *